(12) United States Patent
Haldeman (10) Patent No.: US 10,549,840 B2
(45) Date of Patent: Feb. 4, 2020

(54) ADJUSTABLE BLADE BALANCE MODULE

(71) Applicant: Bell Helicopter Textron Inc., Fort Worth, TX (US)

(72) Inventor: Andrew Paul Haldeman, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 164 days.

(21) Appl. No.: 15/672,087

(22) Filed: Aug. 8, 2017

(65) Prior Publication Data

US 2019/0047682 A1  Feb. 14, 2019

(51) Int. Cl.
*B64C 11/00* (2006.01)
*B64C 29/00* (2006.01)
*B64D 45/00* (2006.01)

(52) U.S. Cl.
CPC ........ *B64C 11/008* (2013.01); *B64C 29/0033* (2013.01); *B64D 45/0005* (2013.01); *B64D 2045/0085* (2013.01)

(58) Field of Classification Search
CPC . B64C 11/008; B64C 29/0033; B64C 27/008; B64D 45/0005; B64D 2045/0085; F04D 29/662
USPC ...................................................... 415/145
See application file for complete search history.

(56) References Cited

U.S. PATENT DOCUMENTS

| | | | |
|---|---|---|---|
| 2,451,541 A | 10/1948 | Doman | |
| 2,460,351 A | 2/1949 | Hoffman et al. | |
| 2009/0252608 A1* | 10/2009 | Metivier | B64C 27/008 416/1 |

FOREIGN PATENT DOCUMENTS

| | | | | |
|---|---|---|---|---|
| CH | 227492 A | | 6/1943 | |
| CH | 227493 A | * | 6/1943 | ............. C07C 29/04 |
| DE | 1955061 A1 | | 5/1971 | |
| EP | 1580543 A2 | * | 9/2005 | ............. G01M 1/36 |
| EP | 1580543 A2 | | 9/2005 | |
| FR | 2926535 A1 | | 7/2009 | |
| FR | 3045714 A1 | | 6/2017 | |

OTHER PUBLICATIONS

European Search Report in related European Patent Application No. 17195815.0, dated Feb. 12, 2018, 4 pages.
Office Action in related European Patent Application No. 17195815.0, dated Feb. 28, 2018, 6 pages.
European Exam Report in related European Patent Application No. 17195815.0, dated Sep. 28, 2018, 3 pages.

* cited by examiner

*Primary Examiner* — Joseph J Dallo
*Assistant Examiner* — Scott A Reinbold
(74) *Attorney, Agent, or Firm* — Lightfoot & Alford PLLC (57) ABSTRACT

An adjustable balance module for the balancing of rotatable blades. The adjustable blade balance module includes a frame that retains and covers an adjustment screw with a mass that translates along a threaded shaft of the adjustment screw. The adjustment screw is incrementally controlled by an adjustment dial that is accessible from an exterior surface of the blade.

20 Claims, 10 Drawing Sheets

ADJUSTABLE BLADE BALANCE MODULE

BACKGROUND

In systems with rotating blades, e.g., rotorcraft or wind turbines, precision balancing of the blades is essential to proper functioning of the system. Typically, the blades are balanced by either adding or subtracting weight to the blades in predetermined locations. For example, the balancing of helicopter blades in the span and chord directions is often accomplished using two separate weight pockets. A first weight pocket located along the pitch-change axis of the blade for span-wise balancing and a second weight pocket proximate the distal end of the blade for chord-wise balancing. These weight pockets are boxes that are affixed within the blade and have a cover that is flush with the surface of the blade. The weight pockets have a removable cover that allows a mechanic to either add or remove mass from either of the two pockets on the blade to affect the balance thereof. Removing the covers and adding/removing weights is time consuming and can lead to a number of issues created by removing the covers. Accordingly, there is a need for a faster, less labor intensive, less intrusive manner of balancing the blades. This disclosure provides a solution that enables a mechanic to quickly and easily balance a blade in the chord-wise and span-wise directions without the need to access the interior of the blade.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The solution presented in this disclosure eliminates the need to access the interior of a blade when balancing the blade. Instead, a pair of adjustable weights are installed within the blade, wherein the location of the weights are adjusted from outside the blade. And the location of the weights within the blade, rather than the addition/subtraction of mass, balances the blade. As explained in detail below, in addition to presenting a solution that allows manual balancing from outside the blade, this disclosure provides a system that enables automated, real-time balancing.

As shown in FIGS. 1-5, an adjustable blade balance module 101 is illustrated. Adjustable blade balance module 101 includes a frame 103 that provides the overall structure of adjustable blade balance module 101 and facilitates attachment of adjustable blade balance module 101 to a rotor blade. It is preferable, although not necessary, to affix adjustable blade balance module 101 to the internal structure of the rotor blade, for example to a spar and or a chord-wise rib. Frame 103 includes a first retainer 105 proximate a first end 107 of frame 103 and a second retainer 109 proximate a second end 111 of frame 103. First and second retainers 105, 109 support and retain an adjustment screw 113, while allowing adjustment screw 113 to rotate therein. First and second retainers 105, 109 may accomplish this functionality by including slots 115, 117. Slots 115, 117 receive grooved portions 119, 121 of a threaded shaft 123 of adjustment screw 113 therein. Threaded shaft 123 has a diameter that is larger than the width of slots 115, 117, while grooved portions 119, 121 have diameters slightly smaller than the width of slots 115, 117, thereby preventing translation of adjustment screw 113 while allowing rotation of adjustment screw 113. Alternatively, adjustment screw 113 may be retained using pins inserted through holes (not shown) in threaded shaft 123, C-clips (not shown) inserted in grooved portions 119, 121, or any other suitable mechanism that will allow rotation while preventing translation.

Adjustment screw 113 further includes a head 125 at a proximal end 127, opposite a distal end 129, of threaded shaft 123. A head 125 is preferably configured to engage an adjustment dial 131 to facilitate rotation of adjustment screw 113. Engagement is preferably accomplished via the interaction between beveled gear teeth 133 on head 125 and complimentary beveled gear teeth 135 on adjustment dial 131. Adjustment dial 131 is located in an opening 137 of a cover 139 so that the dial may be accessed by a mechanic from the exterior of the rotor blade in which adjustable blade balance module 101 is installed, without the need to remove cover 139. Adjustment dial 131 also includes a recess 141 configured to receive a tool (not shown) therein to facilitate rotation thereof. The tool may be a screwdriver, Allen key, star key, or any other tool suitable for causing rotation of adjustment dial 131. In this configuration, rotation of adjustment dial 131 causes a corresponding rotation of adjustment screw 113 about an axis that is perpendicular to the axis of rotation of adjustment dial 131. Alternative configurations are also possible, for example, adjustment dial 131 may have an axis of rotation that is parallel (not shown) to that of adjustment screw 113, wherein engagement is via standard gear teeth. In addition, beveled gear teeth 133, 135 may be omitted in favor of a friction fit between adjustment dial 131 and head 125. In yet another configuration, adjustment dial 131 may be omitted entirely in favor of having head 125 protrude slightly through opening 137 such that a mechanic can directly rotate adjustment screw 113 via head 125 from the exterior of the rotor blade. The degree of rotation of adjustment dial 131 is preferably provided in fine increments and controlled by a spring-detent mechanism 142. Spring-detent mechanism 142 provides a tactile and audible click with each incremental rotation so that a mechanic may easily track the number of increments rotated.

Rotation of threaded shaft 123 of adjustment screw 113 causes translation of a mass 143 along a length of threaded shaft 123. This translation is produced by the threads of shaft 123 driving against complementary threads of a threaded opening 145 that extends through mass 143. Rotation of mass 143 is prevented by the interaction between rails 147 located on side panels 149 of frame 103 with grooves 151 on mass 143. It should be understood by one of ordinary skill in the art that the rotation of mass 143 could be prevented by other anti-rotation structures, for example, sliding splines or matching the shape of an outer surface of mass 143 to an inner surface of frame 103. Generally, any portion of mass 143 interacting with a stationary structure may be suitable for preventing rotation of mass 143.

Figure 1:
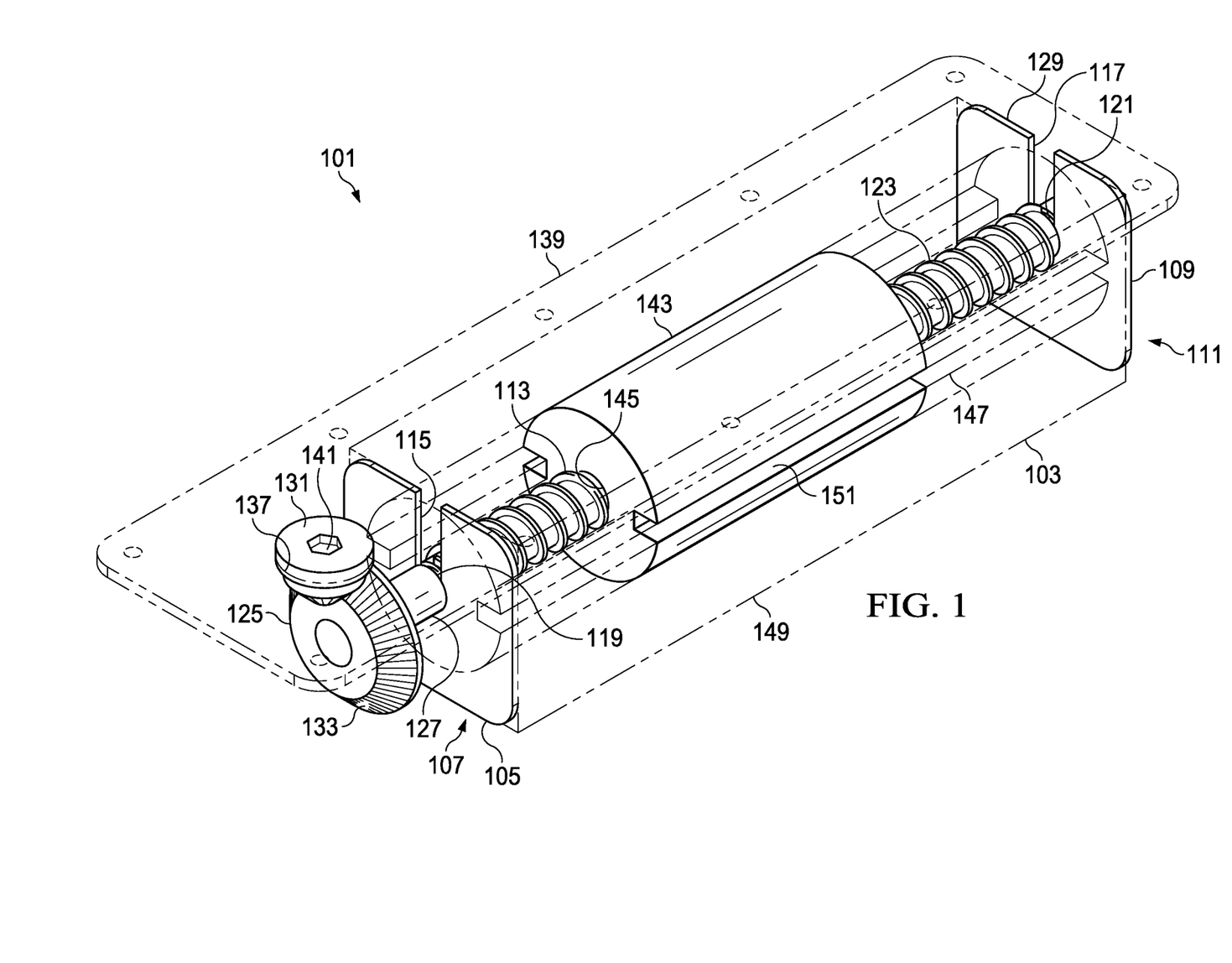
FIG. 1 is an oblique view of an adjustable blade balance module according to this disclosure.
Figure 2:
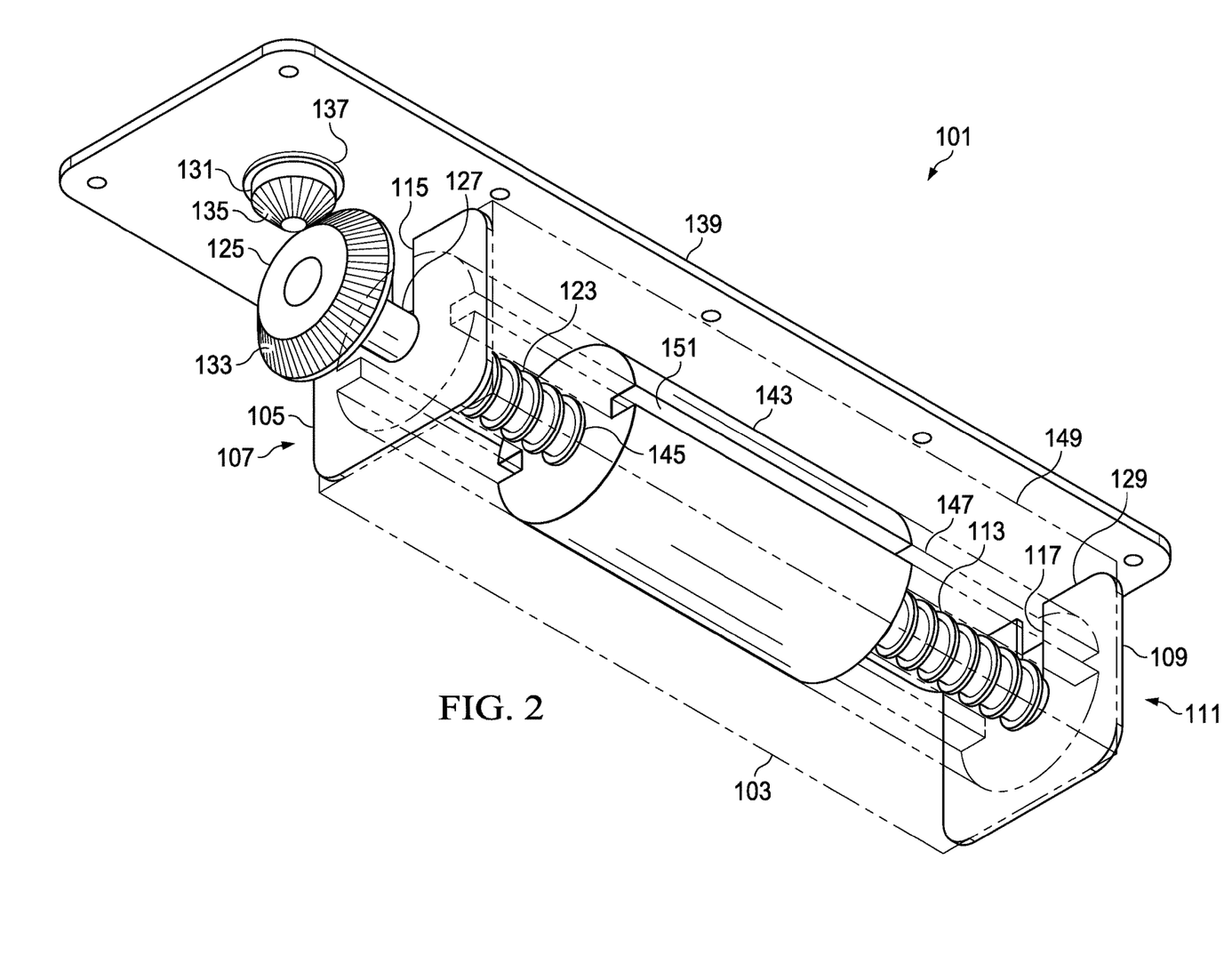
FIG. 2 is an oblique view of the adjustable blade balance module of FIG. 1.
Figure 3:
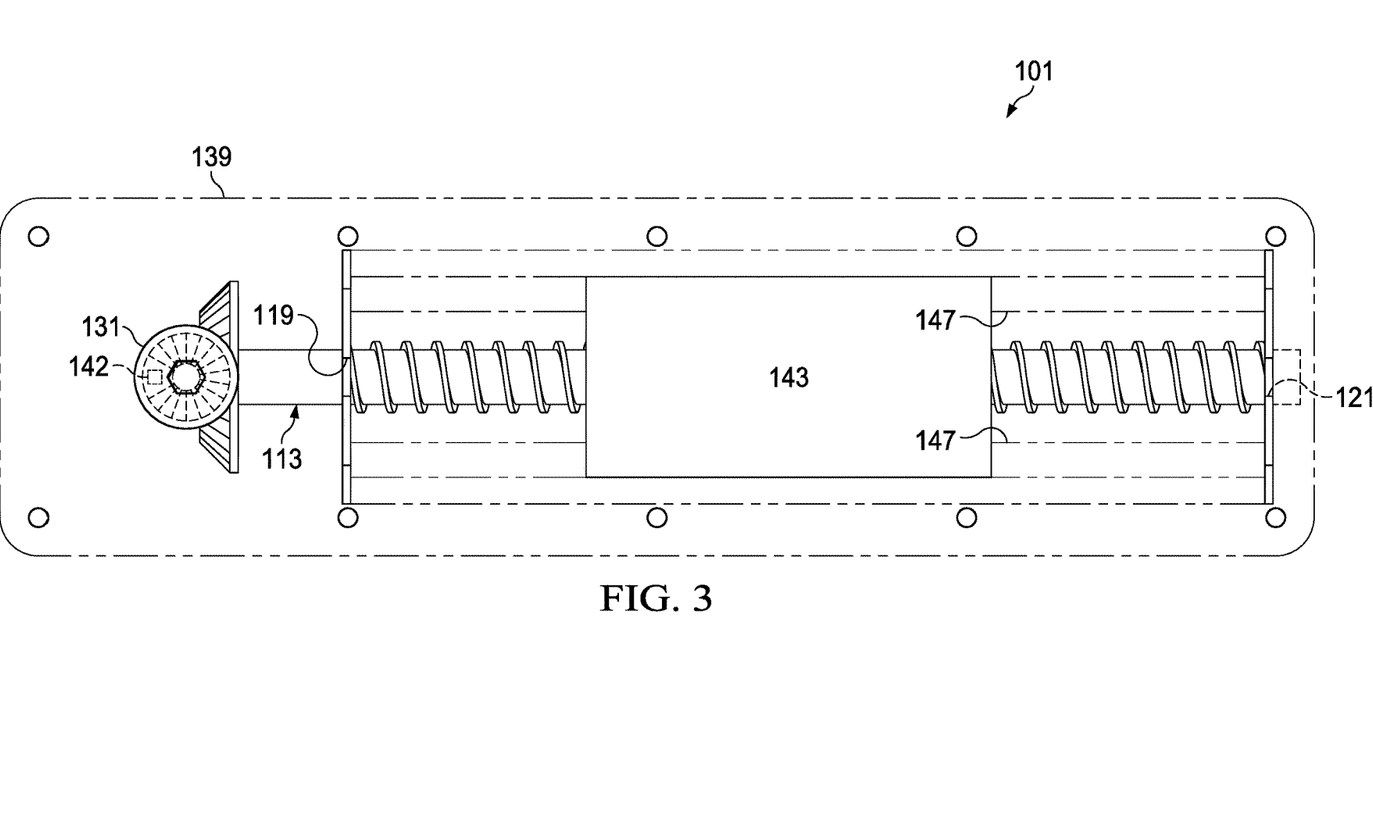
FIG. 3 is a top view of the adjustable blade balance module of FIGS. 1 and 2.
Figure 4:
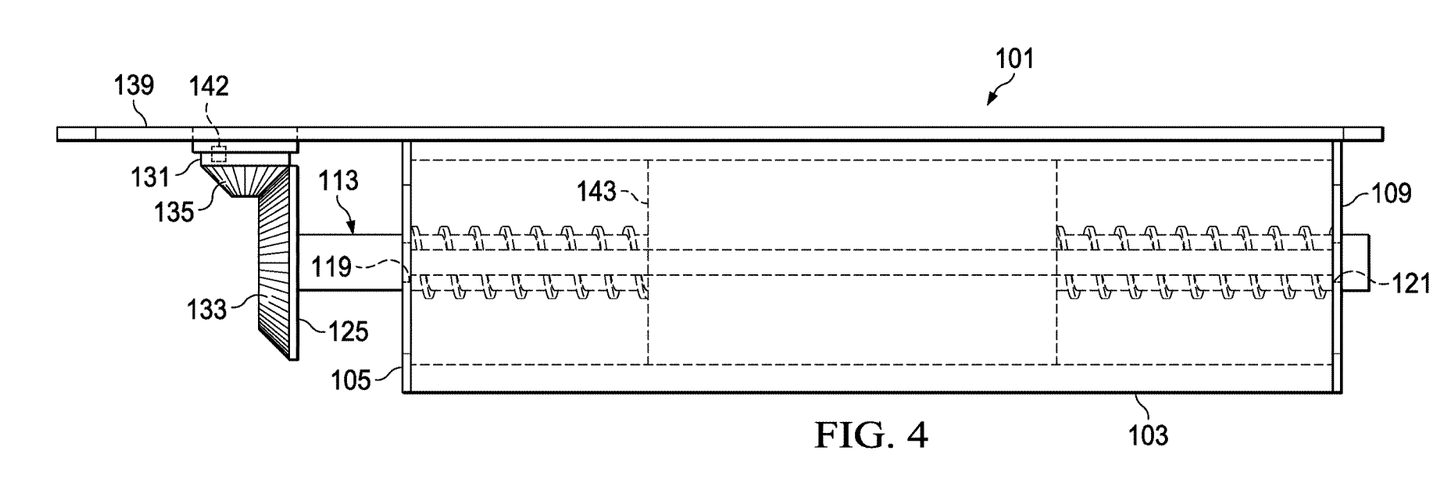
FIG. 4 is a profile view of the adjustable blade balance module of FIGS. 1-3.
Figure 5:
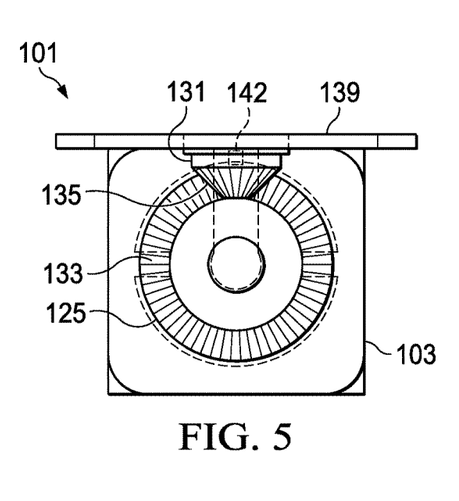
FIG. 5 is a side view of the adjustable blade balance module of FIGS. 1-4.
Figure 6:
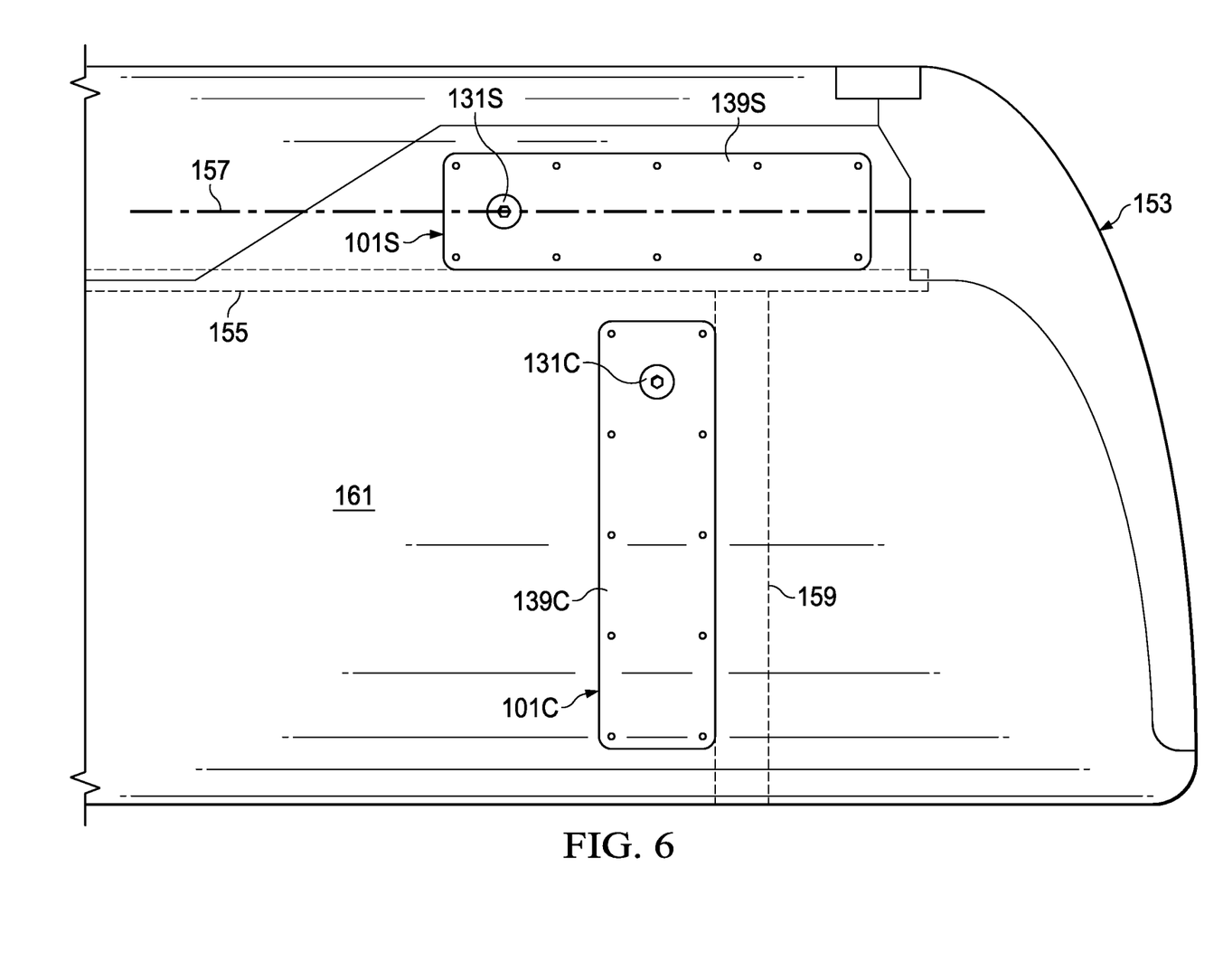
FIG. 6 is a top view of a portion of a rotor blade according to this disclosure.

As shown in FIG. 6, two adjustable blade balance modules 101S, 101C are installed in a rotor blade 153. A first adjustable blade balance module 101S is attached to a spar 155 and is preferably oriented such that the axis of rotation of adjustment screw of 101S is coaxial with a pitch axis 157 of rotor blade 153. Accordingly, adjustment of the location of the mass of adjustable blade balance module 101S affects the span-wise balance of rotor blade 153. A second adjustable blade balance module 101C is attached to a chord-wise rib 159 such that the axis of rotation of the adjustment screw of 101C is orthogonal to pitch axis 157. Accordingly, adjustment of the location of the mass of adjustable blade balance module 101C affects the chord-wise balance of rotor blade 153. Optimally, the covers 139S, 139C and adjustment dials 131S, 131C are configured to match the shape of an exterior surface of skin 161 such that adjustable blade balance modules 101S, 101C cause minimal additional drag. Also note, while the embodiment shown describes adjustable blade balance modules 101S, 101C being incorporated into the blade, adjustable blade balance modules 101S, 101C could be incorporated into a detachable blade tip instead.

The method of balancing a rotor blade utilizing adjustable blade balance modules 101S, 101C is as follows. Rotor blade 153 is placed on a rotor balancing fixture (not shown) that enables measurement of the span-wise and chord-wise moments of rotor blade 153. Those actual moments are then compared to that of a master blade which possesses the precise moments desired. The next step is calculating the distances that the masses must be moved in order to cause the actual moments of rotor blade 153 to match the moments of the master blade. Because adjustment dials 131S, 131C move the respective masses a known distance for each "click," a mechanic simply needs to rotate adjustment dials 131S, 131C the necessary number of "clicks" to move the respective masses to the required locations that will produce the desired moments. This simplified method eliminates the need for weight pockets that need to be opened to add or subtract weight to affect balancing.

Figure 7:
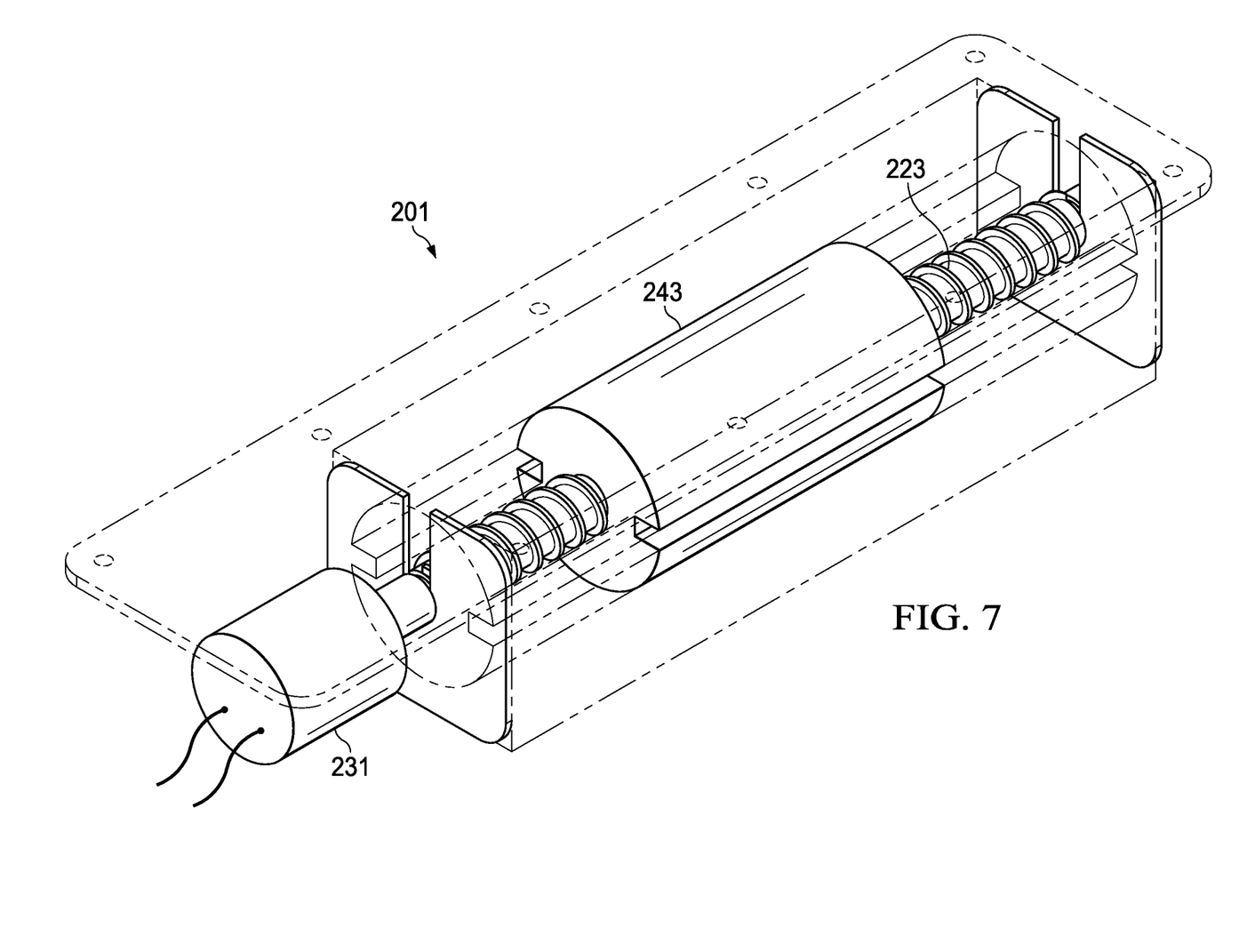
FIG. 7 is an oblique view of another embodiment of an adjustable blade balance module according to this disclosure.
Figure 8:
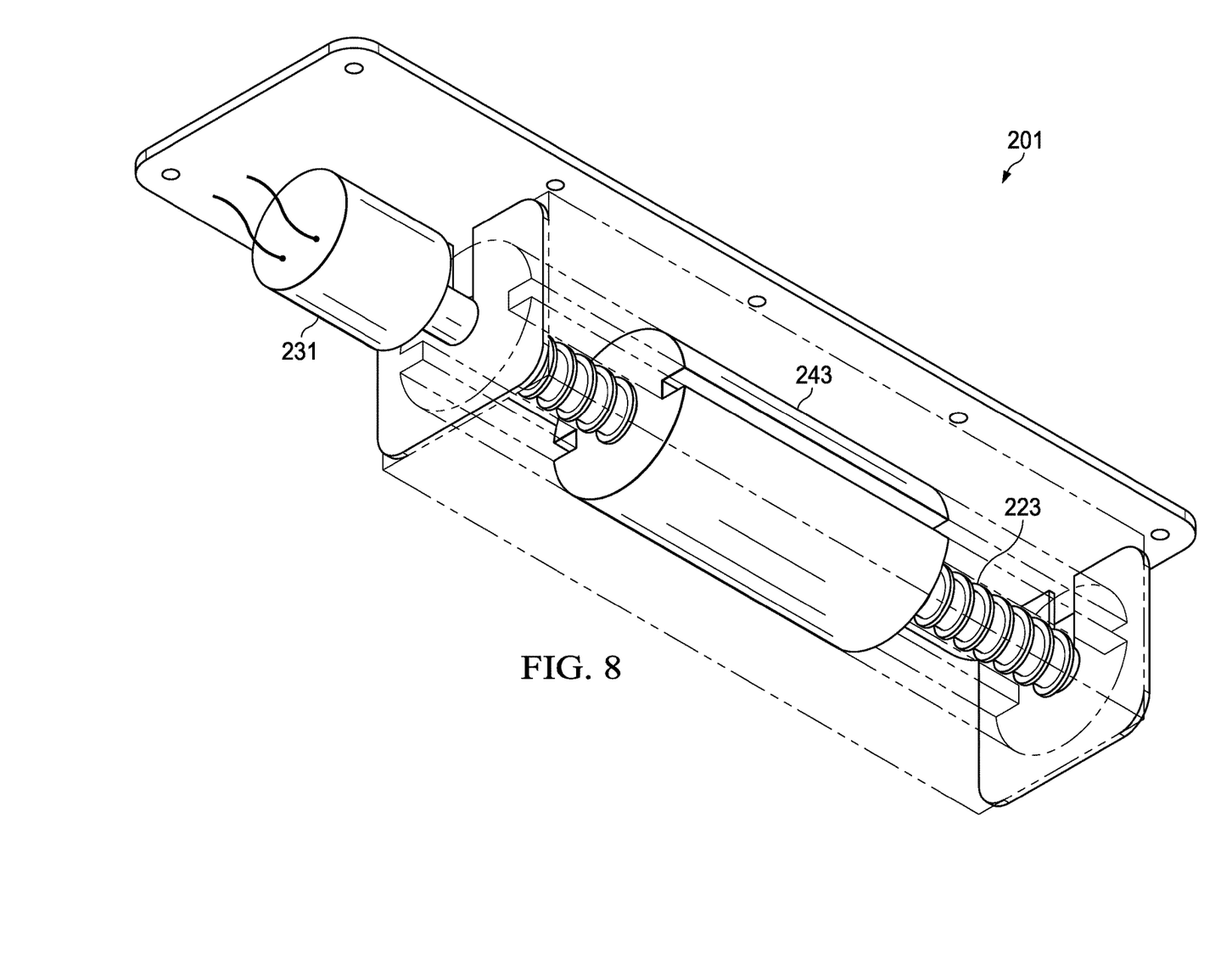
FIG. 8 is an oblique view of the adjustable blade balance module of FIG. 7.

Another embodiment of an adjustable blade balance module 201 is shown in FIGS. 7 and 8. Adjustable blade balance module 201 is similar to adjustable blade balance module 101 except that it replaces the manual adjustment dial 131 with a stepper motor 231. As such, in adjustable blade balance module 201, movement of a mass 243 along a length of a threaded shaft 223 is controlled by incremental rotations of stepper motor 231. Adjustable blade balance module 201 is easily incorporated on rotorcraft that include rotor tip lighting systems or electrical de-icing systems. Since these rotorcraft already include power lines running to the rotor blades, running power to stepper motors 231 would require minimal additional labor/cost. In addition, as discussed below, this embodiment makes it possible provide real-time balancing adjustments while the rotorcraft is in flight. Alternative embodiments of adjustable blade balance module 201 are possible. For example, a motor may replace mass 243 as the balancing weight. That is, threaded shaft 223 would be fixed in place and the motor would rotate an internal mechanism that causes the motor to traverse the length of threaded shaft 223.

Figure 9:
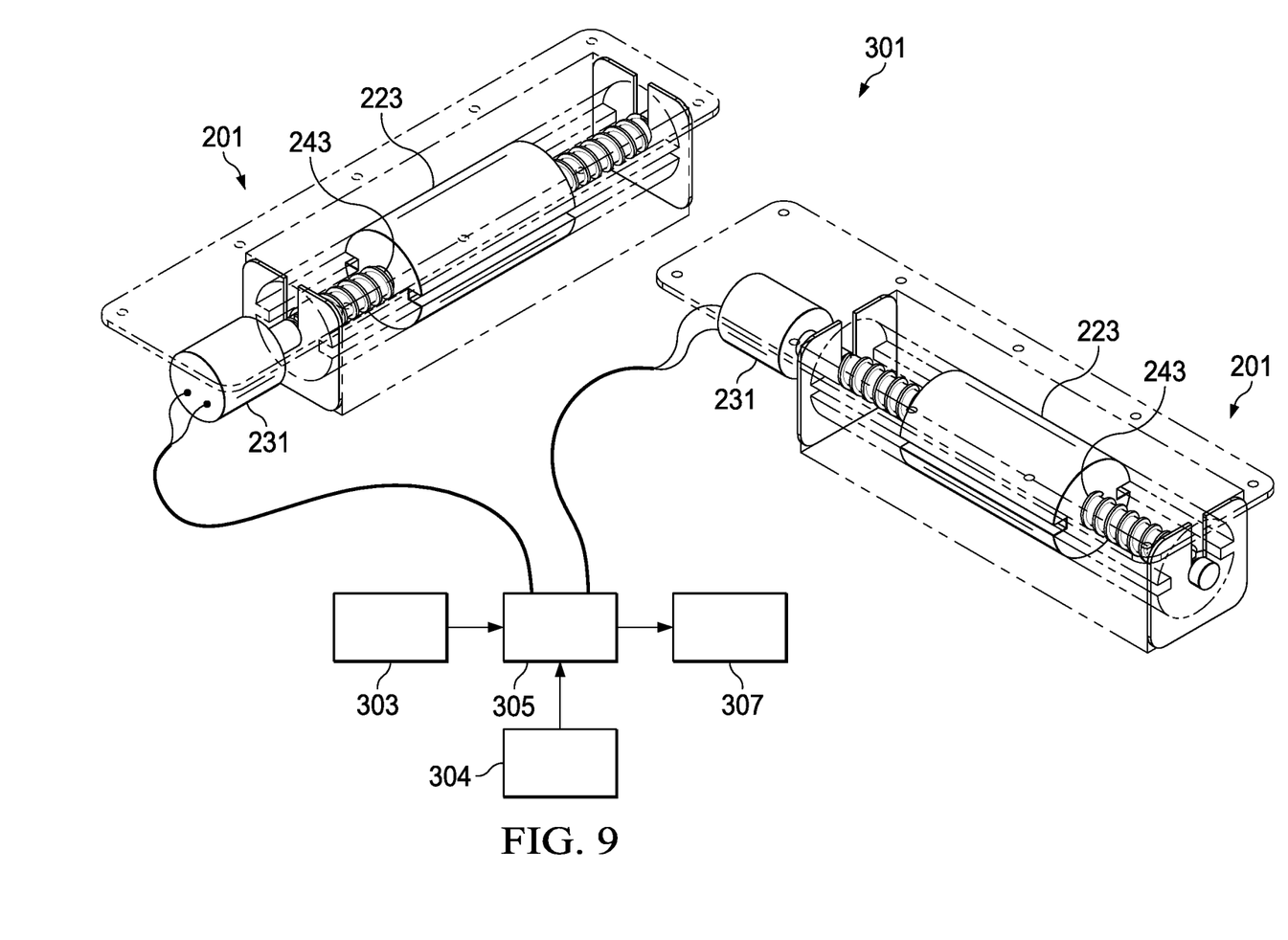
FIG. 9 is a diagram of a system for balancing a rotor blade according to this disclosure.

FIG. 9 is a diagram showing a system 301 utilized to provide real-time rotor blade balancing. System 301 utilizes the powered adjustable blade balance modules 201 shown in FIGS. 7 and 8. System 301 further includes a first sensor 303, preferably an accelerometer, attached to a fixed system, such as an airframe. System 301 also includes a second sensor 304, preferably a proximity sensor, attached to a rotor system. First sensor 303 measures the magnitude of vibrations and second sensor 304 indicates the azimuth of the rotor system. First and second sensors 303, 304 transmit this data to a processor 305. Processor 305 utilizes this data to calculate the difference between the actual moments of the blade and the desired moments. This calculation may be based on experimental data collected by observing vibrations caused by testing rotor blades with various moments deviating from the desired moments by known amounts. After calculating the difference between the actual and desired moments, the processor calculates the distances the masses 243 must be moved to balance the rotor blade. Processor 305 then sends a signal to stepper motors 231 to move the masses 243 the calculated distances. This process is preferably performed continuously in real-time to maintain perfect balance of the rotor blades while in flight. System 301 would remedy in-flight rotor blade balance issues that can be common when flying in the rain, where water may get into the rotor blades and cause them to require rebalancing. Processor 305 may also be configured to transmit a signal to a cockpit 307 to notify a pilot if either mass 243 reaches a predetermined percentage of the maximum adjustment range. This signal will notify the pilot that he/she should land the rotorcraft as soon as possible before the ability of system 301 to rebalance the rotor blade is exhausted. System 301 may be part of or utilize existing components of the Health and Usage Monitoring System ("HUMS") of a rotorcraft. The HUMS should also store any data regarding in-flight rebalancing for analysis by a maintenance crew post-flight.

Figure 10:
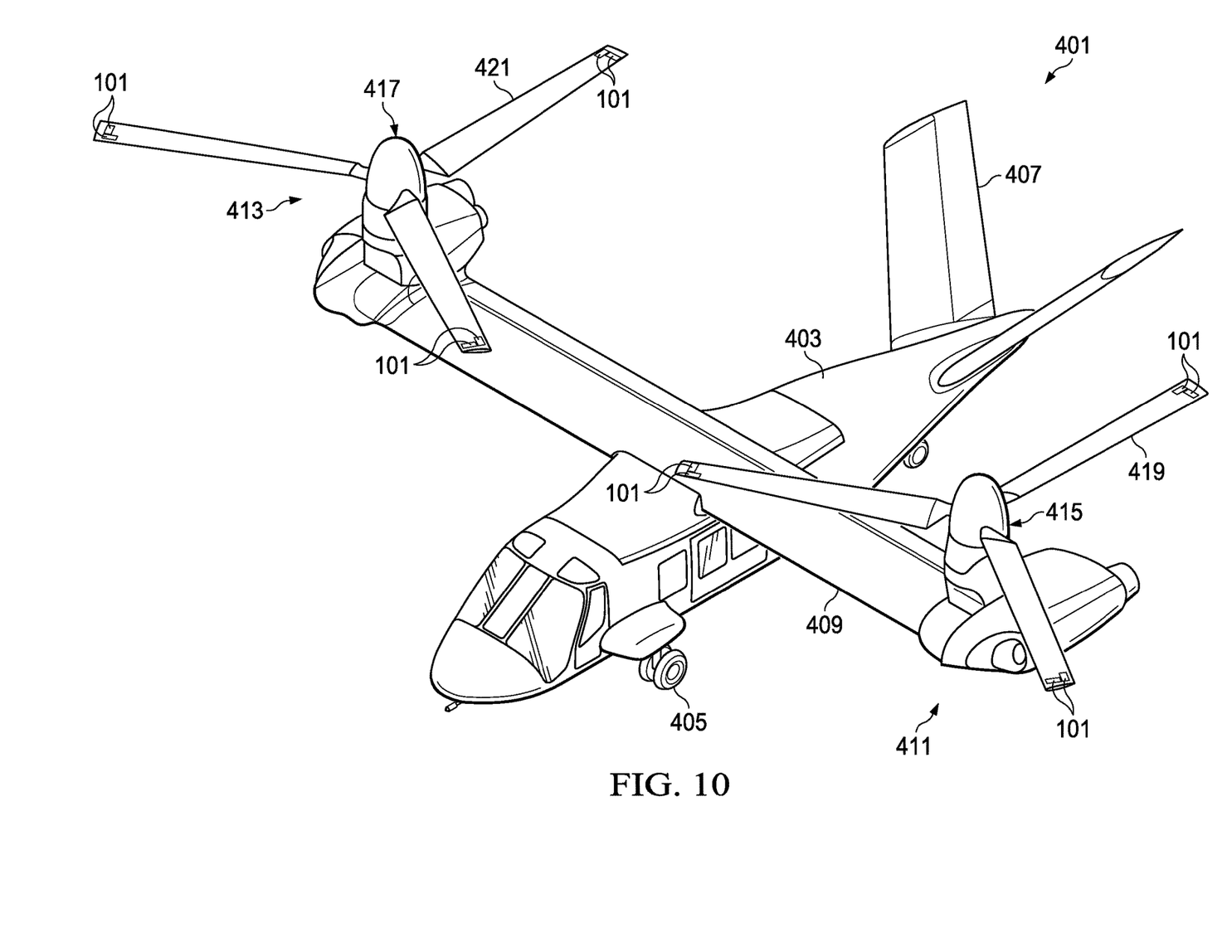
FIG. 10 is an oblique view of an aircraft including a plurality of adjustable blade balance modules according to this disclosure.

Referring to FIG. 10, a tiltrotor aircraft 401 is illustrated. Tiltrotor aircraft 401 may include a fuselage 403, a landing gear 405, a tail member 407, a wing 409, a propulsion system 411, and a propulsion system 413. Each propulsion system 411, 413 includes a fixed engine and a rotatable proprotor 415 and 417, respectively, associated therewith. The position of proprotors 415, 417, as well as the pitch of rotor blades 419, 421, can be selectively controlled in order to selectively control direction, thrust, and lift of tiltrotor aircraft 401.

FIG. 10 illustrates tiltrotor aircraft 401 in a helicopter mode, in which proprotors 415, 417 are positioned substantially vertical to provide a lifting thrust. In an airplane mode, proprotors 415, 417 are positioned substantially horizontal to provide a forward thrust in which a lifting force is provided by wing 409. It should be appreciated that tiltrotor aircraft 401 can be operated such that proprotors 415, 417 are positioned between airplane mode and helicopter mode, which may be referred to as conversion mode.

Figure 11:
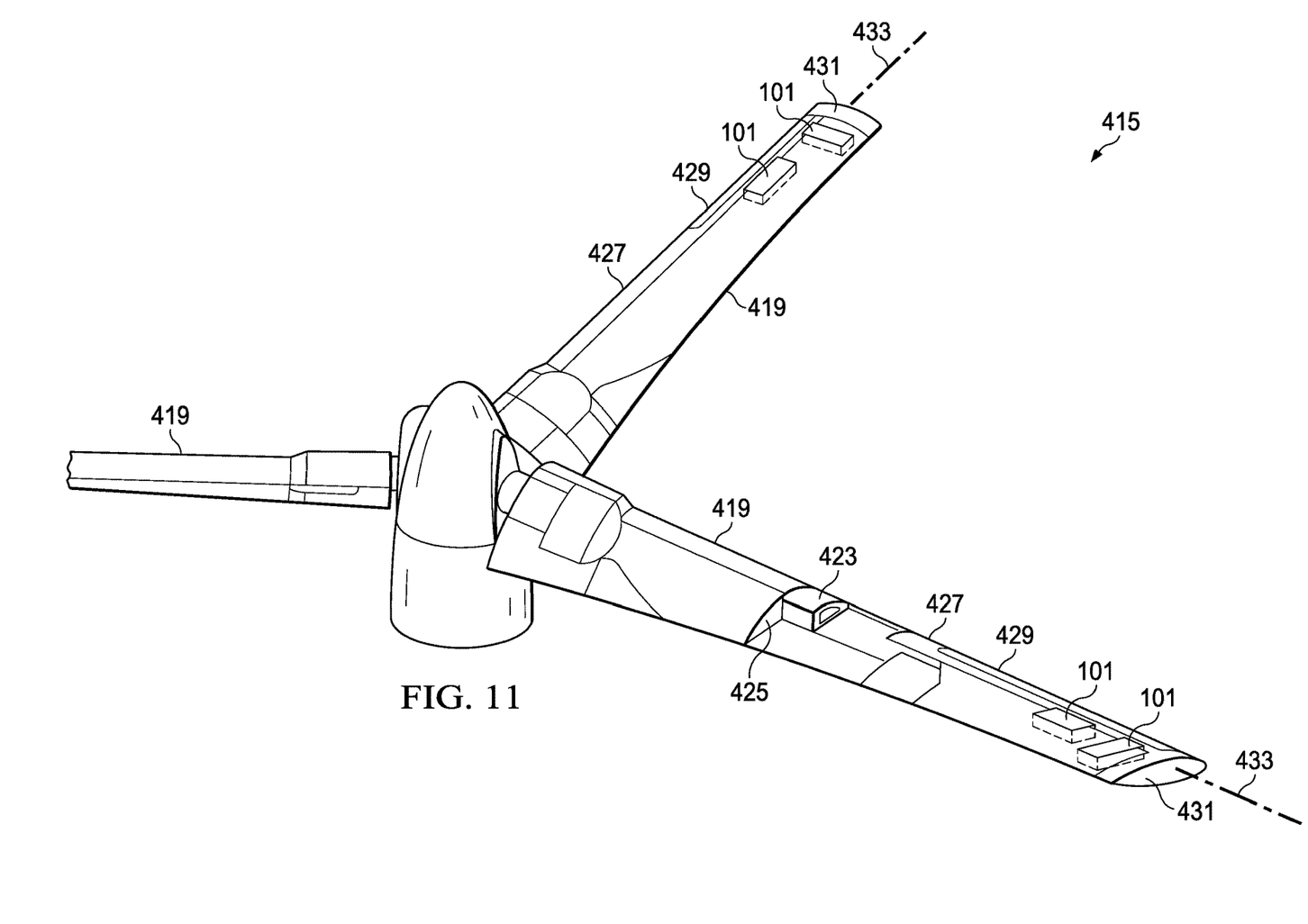
FIG. 11 is a partial oblique view of a rotor of the aircraft of FIG. 10.

FIG. 11 illustrates proprotor 415 and shows that rotor blades 419 comprise composite construction. More specifically, rotor blades 419 generally comprise a spar 423 that serves as a primary structural component, a lightweight composite core 425, an outer skin 427, an erosion shield 429, and an end cap 431. In other embodiments, rotor blades 419 may further comprise heater mats, foam fillings, and/or other features. Rotor blades 419 further comprise a pitch change axis 433 about which the rotor blades 419 may be rotated to change a pitch of the rotor blades 419. Still further, each of rotor blades 419 comprise a pair of adjustable blade balance modules 101. A first adjustable blade balance module 101 located along pitch change axis 433 for affecting the span-wise balance and a second adjustable blade balance 101 oriented perpendicular to pitch change axis 433, proximate blade cap 431, for affecting the chord-wise balance. Proprotor 417 is substantially symmetric to proprotor 415.

Further, proprotors 415, 417 are illustrated in the context of tiltrotor aircraft 401. However, proprotors 415, 417 may be implemented on other tiltrotor aircraft. For example, an alternative embodiment may include a quad tiltrotor that has an additional wing member aft of wing 409, the additional wing member may have additional proprotor systems similar to proprotors 415, 417. In another embodiment, proprotors 415, 417 may be integrated into a variety of tiltrotor aircraft configurations. Moreover, a single proprotor 415 may be utilized on a single, or multiple, rotor helicopter. In addition, although tiltrotor aircraft 401 is shown with adjustable blade balancing modules 101, it should be understood that tiltrotor aircraft may instead include system 301 and powered adjustable blade balancing modules 201 associated therewith.

It should be noted that the adjustable balance modules and systems described in this disclosure are not limited to use with rotorcraft. These adjustable balance modules and systems would be very effective, for example, for balancing wind turbine blades. Moreover, they could also be used to balance any mechanical system that includes a rotating body. For example, a pair the adjustable balance modules could be affixed orthogonally about the axis of rotation of a wheel. Such a configuration would eliminate the need to attach weights to the rim of the wheel to balance the wheel after mounting a tire. The size and materials used to construct the modules can vary greatly depending upon the application. However, because the adjustable balance modules will contribute to the total rotating mass, the modules should be made as light as practicable.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An adjustable blade balance module, comprising:
   a frame having a first retainer proximate a first end of the frame, a second retainer proximate a second end of the frame, a length extending from the first end of the frame to the second end of the frame;
   a cover extending over at least a portion of the length of the frame;
   an adjustment screw including a threaded shaft and a head, the threaded shaft having a distal end, a proximal end, and a length therebetween, the threaded shaft being retained by the first retainer proximate the distal end of the threaded shaft, the threaded shaft being retained by the second retainer proximate the proximal end of the threaded shaft;
   a mass defining a threaded opening extending therethrough, the mass having the threaded shaft of the adjustment screw extending through the threaded opening, such that rotation of the threaded shaft would cause translation of the mass along the length of the threaded shaft; and
   an adjustment dial configured to cause rotation of the adjustment screw when the adjustment dial is rotated;
   wherein the adjustable blade balance module is a separable component.

2. The adjustable blade balance module of claim 1, wherein the adjustment dial is configured to rotate in fixed increments which cause incremental rotations of the adjustment screw and corresponding incremental translations of the mass along the length of the threaded shaft.

3. The adjustable blade balance module of claim 2, wherein the adjustment dial includes a recess configured to receive a tool therein to facilitate rotation of the adjustment dial.

4. The adjustable blade balance module of claim 3, wherein the frame includes a frame surface configured to contact a mass surface to prevent relative rotation between the mass and the frame.

5. The adjustable blade balance module of claim 4, wherein the adjustment dial and the head of the adjustment screw include complimentary beveled gear teeth.

6. The adjustable blade balance module of claim 5, wherein the fixed incremental rotations of the adjustment dial are controlled by a spring-loaded detent mechanism.

7. The adjustable blade balance module of claim 6, wherein the frame includes panels substantially enclosing the mass and the majority of the length of the adjustment screw.

8. A rotor blade, comprising:
a spar extending along a majority of a length of the blade;
a skin covering a majority of the blade;
a first adjustable balance module attached to the spar, the first adjustable balance module, comprising:
a frame having a first retainer proximate a first end of the frame, a second retainer proximate a second end of the frame, a length extending from the first end of the frame to the second end of the frame;
a cover extending over at least a portion of the length of the frame, the cover being substantially flush with the skin;
an adjustment screw including a threaded shaft and a head, the threaded shaft having a distal end, a proximal end, and a length therebetween, the threaded shaft being retained by the first retainer proximate the distal end of the threaded shaft, the threaded shaft being retained by the second retainer proximate the proximal end of the threaded shaft;
a mass defining a threaded opening extending therethrough, the mass having the threaded shaft of the adjustment screw extending through the threaded opening, such that rotation of the threaded shaft would cause translation of the mass along the length of the threaded shaft; and
an adjustment dial configured to cause rotation of the adjustment screw when the adjustment dial is rotated.

9. The rotor blade of claim 8, wherein a central longitudinal axis of the adjustment screw of the first adjustable balance module is approximately coaxial with a pitch axis of the rotor blade.

10. The rotor blade of claim 9, further comprising a second adjustable balance module, the second adjustable balance module, comprising:
a frame having a first retainer proximate a first end of the frame, a second retainer proximate a second end of the frame, a length extending from the first end of the frame to the second end of the frame;
a cover extending over at least a portion of the length of the frame, the cover being substantially flush with the skin;
an adjustment screw including a threaded shaft and a head, the threaded shaft having a distal end, a proximal end, and a length therebetween, the threaded shaft being retained by the first retainer proximate the distal end of the threaded shaft, the threaded shaft being retained by the second retainer proximate the proximal end of the threaded shaft;
a mass defining a threaded opening extending therethrough, the mass having the threaded shaft of the adjustment screw extending through the threaded opening, such that rotation of the threaded shaft would cause translation of the mass along the length of the threaded shaft; and
an adjustment dial configured to rotate the adjustment screw when the dial is rotated,
wherein a central longitudinal axis of the adjustment screw of the second adjustable balance module is orthogonal to the pitch axis of the rotor blade.

11. The rotor blade of claim 10, wherein the adjustment dial of each of the first and second adjustable balance modules are configured to rotate in fixed increments, such that the incremental rotations of the adjustment dials cause incremental rotations of the respective adjustment screws and corresponding incremental translations of the respective masses along the lengths of the respective threaded shafts, and the adjustment dials each include a recess configured to receive a tool therein to facilitate rotation of the adjustment dials.

12. The rotor blade of claim 11, wherein the frame of each of the first and the second adjustable balance modules include a frame surface configured to contact a mass surface to prevent relative rotation between the mass and the frame.

13. The rotor blade of claim 12, wherein the adjustment dial and the head of the adjustment screw of each of the first and second adjustable balance modules include complimentary beveled gear teeth.

14. The rotor blade of claim 13, wherein the frame of each of the first and second adjustable balance modules include panels substantially enclosing the mass and the majority of the length of the adjustment screw.

15. A system for balancing a rotor blade, comprising:
a first adjustable blade balance module, comprising:
a frame having a first retainer proximate a first end of the frame, a second retainer proximate a second end of the frame, a length extending from the first end of the frame to the second end of the frame;
an adjustment screw including a threaded shaft and a head, the threaded shaft having a distal end, a proximal end, and a length therebetween, the threaded shaft being retained by the first retainer proximate the distal end of the threaded shaft, the threaded shaft being retained by the second retainer proximate the proximal end of the threaded shaft;
a mass defining a threaded opening extending therethrough, the mass having the threaded shaft of the adjustment screw extending through the threaded opening, such that rotation of the threaded shaft would cause translation of the mass along the length of the threaded shaft; and
an adjustment motor engaging the head of the adjustment screw, the adjustment motor being configured to cause rotation of the adjustment screw;
a sensor configured to detect vibrations caused by an unbalanced rotor blade;
wherein the first adjustable blade balance module is a separable component;
and
a processor being configured to receive data from the sensor, to utilize the data received from the sensor to calculate a distance the mass must move along a span of the blade to balance the blade span-wise, and to send a signal to the adjustment motor to rotate until the mass moves the calculated distance.

16. The system of claim 15, further comprising:
a second adjustable blade balance module, comprising:
a frame having a first retainer proximate a first end of the frame, a second retainer proximate a second end of the frame, a length extending from the first end of the frame to the second end of the frame;
an adjustment screw including a threaded shaft and a head, the threaded shaft having a distal end, a proximal end, and a length therebetween, the threaded shaft being retained by the first retainer proximate the distal end of the threaded shaft, the threaded shaft being retained by the second retainer proximate the proximal end of the threaded shaft;
a mass defining a threaded opening extending therethrough, the mass having the threaded shaft of the adjustment screw extending through the threaded opening, such that rotation of the threaded shaft would cause translation of the mass along the length of the threaded shaft; and an adjustment motor engaging the head of the adjustment screw, the adjustment motor being configured to cause rotation of the adjustment screw;

wherein the processor is further configured to utilize the data received from the sensor to calculate a distance the mass of the second adjustable blade balance module must move along a chord of the blade to balance the blade chord-wise, and to send a signal to the adjustment motor of the second adjustable blade balance module to rotate until the mass of the second adjustable blade balance module moves the distance calculated to balance the blade chord-wise.

17. The system of claim 16, wherein the sensor comprises an accelerometer.

18. The system of claim 17, wherein the processor is configured to transmit a signal to notify a pilot if the mass of the first or second adjustable blade balance modules reaches a predetermined percentage of a maximum adjustment.

19. The system of claim 18, wherein the system is configured to balance the blade in real-time.

20. The system of claim 19, wherein the processor is part of a Health and Usage Monitoring System.

* * * * *